United States Patent [19]

Uebber

[11] Patent Number: 5,526,374
[45] Date of Patent: Jun. 11, 1996

[54] DIRECT CURRENT ELECTRIC ARC FURNACE

[75] Inventor: Norbert Uebber, Langenfeld, Germany

[73] Assignee: Mannesmann Aktiengesellschaft, Dusseldorf, Germany

[21] Appl. No.: 335,688

[22] Filed: Nov. 8, 1994

[30] Foreign Application Priority Data

Nov. 8, 1993 [DE] Germany ............ 43 38 555.9

[51] Int. Cl.⁶ .......................................... H05B 7/144
[52] U.S. Cl. .................................. 373/107; 373/108
[58] Field of Search ............................... 373/102, 103, 373/107, 108

[56] References Cited

U.S. PATENT DOCUMENTS

| | | | |
|---|---|---|---|
| 3,885,082 | 5/1975 | Hanas | 373/107 |
| 4,356,340 | 10/1982 | Stenkist | 373/107 |
| 4,856,021 | 8/1989 | Janiak et al. | 373/108 |

FOREIGN PATENT DOCUMENTS

| | | |
|---|---|---|
| 0255793 | 9/1990 | European Pat. Off. |
| 2558879 | 7/1976 | Germany |
| 3205270 | 10/1982 | Germany |
| 4130397 | 3/1993 | Germany |

*Primary Examiner*—Tu Hoang
*Attorney, Agent, or Firm*—Cohen, Pontani, Lieberman, Pavane

[57] ABSTRACT

A direct current electric arc furnace for melting metal, which furnace includes a furnace vessel having a lower vessel part lined with a refractory material and a metal upper vessel part through which a cooling agent can flow. A cover is adapted and arranged to close the furnace vessel. Electric current is fed to the furnace, by an arrangement including a main electrode extending into the furnace vessel through the cover, a bottom electrode located at the bottom of the lower vessel part, and feed lines that connect the electrodes to a direct current source. The feed lines include at least two current feeds connected to the bottom electrode, each current feed having a line segment parallel to a main axis of the main electrode and a shield for at least partially magnetically shielding the upper vessel part at an arc level from magnetic fields generated by the line segments parallel to the main axis. A drive moves the shield parallel to the line segment in order to weaken a magnetic field produced by the current at the arc level.

8 Claims, 2 Drawing Sheets

DIRECT CURRENT ELECTRIC ARC FURNACE

BACKGROUND OF THE INVENTION

1. Field of the Invention

The invention relates to a direct current electric arc furnace for melting metal, particularly scrap, which has a furnace vessel that is closable by a cover. The furnace vessel consists of a lower vessel with a refractory-lining and a metallic upper vessel through which coolant flows. The arc furnace further has a device for feeding the electric current. The current feeding device consists of an electrode which extends through the cover into the furnace vessel and a bottom electrode located in the bottom of the lower vessel. Both electrodes are connected to a direct current source via feed lines.

2. Description of the Prior Art

In direct current furnaces, the direct current source is usually located on one side of the furnace. As a result of magnetic fields at the high current strengths utilized, the electric conductors which lead to the electrodes in the furnace vessel exert a deflecting force on the arc located between the electrode extending into the furnace and the bottom electrode or the melting bath. The electromagnetic forces acting from the current paths into the melt result in a deflection of the arc before the cathode in the direction of the anode, essentially away from the side from which the current is supplied.

An electric arc furnace is required to melt scrap with maximum productivity without locally increasing the wear rate of the furnace vessel. In known arc furnaces, the attempt has therefore been made to center the arc.

A direct current electric arc furnace is known from DE 32 05 270 A1 in which both the positive and negative conductors are drawn together to a point in the furnace structure, from which the individual conductors run in a specified manner above the furnace, parallel from there to the furnace axis on a plane below the furnace, and finally to the floor electrode. This arrangement of conductors is not only elaborate in design, but also cost-intensive. Furthermore, it limits the accessibility of the furnace to a unacceptable extent.

A direct current electric furnace for melting metal is known from EP 0 255 793 B1, in which, in order to break down the arc deflection effect, a magnetic screen is arranged on the bottom of the vessel in such a form as to cover the portion of the bottom that encompasses a hearth electrode and at least a portion of the corresponding return line. The metal portion of the lower furnace part known from the aforementioned reference has a metal plate with high magnetic permeability, which must be taken into account as the furnace is being constructed.

So that the electromagnetic fields produced by currents below the vessel bottom exert an adequate influence on the electric arc, the vessel mantle in this area consists of expensive, non-magnetic material, as a rule, high-grade steel.

SUMMARY OF THE INVENTION

Accordingly, it is an object of the present invention to provide an arc furnace in which the burn direction of the electric arc can be variably influenced with means that are simple in design and low in maintenance expense.

The direct current electric arc furnace according to the invention has shields which are arranged, for the purpose of screening the magnetic field produced at the level of the electric arc by the current in at least two conductor feeds connected to the bottom electrode, between the line segments parallel to the furnace main axis and the furnace upper vessel. The shields are connected to drives which allow movement parallel to the vessel. By vertical or horizontal movement, the shields can screen the line segments either completely or partially and thus can influence the deflection height and direction of the electric arc.

This exertion of variable influence on the burn direction of the arc makes it possible to load the metal cooling elements and the fireproof areas of the furnace in a settable, thermally more even fashion and, at the same time, to deliberately expose scrap accumulations in the furnace vessel to higher heat energy. This leads to greater uniformity of the scrap melt-down, without the occurrence of energy losses through cooling elements exposed to locally excessive arc radiation and the ceramic lining. Not only are lower wear rates achieved for the metal cooling elements and the fireproof areas; in addition, a higher productivity level of the electric arc furnace becomes possible and thus shorter tap-to-tap times result.

In addition, it is possible to heat usually colder areas of the charge in the electric arc furnace, particularly in the bay and door area, in a preferential time-defined manner.

Whereas the arrangement and layout of static compensation elements are difficult to define and may be definable only at great expense (because not only the feed but also other magnetic materials in the electric carrying device, the bay, the door, etc. influence the arc deflection), this is set or controlled according to the present invention by a simple adjustment in the furnace. In addition, control of changes in such process-conditioned states as the following is achieved:

- irregular position and thick distribution of the scrap in the furnace;
- convective influences in the furnace which vary locally and by time, such as opening the door; and
- circumstances which influence plasma columns, especially the gas composition and the thermal conditions in the environment of the columns.

The screening is especially effective in the area of the furnace vessel in which exclusively copper cooling elements are used.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
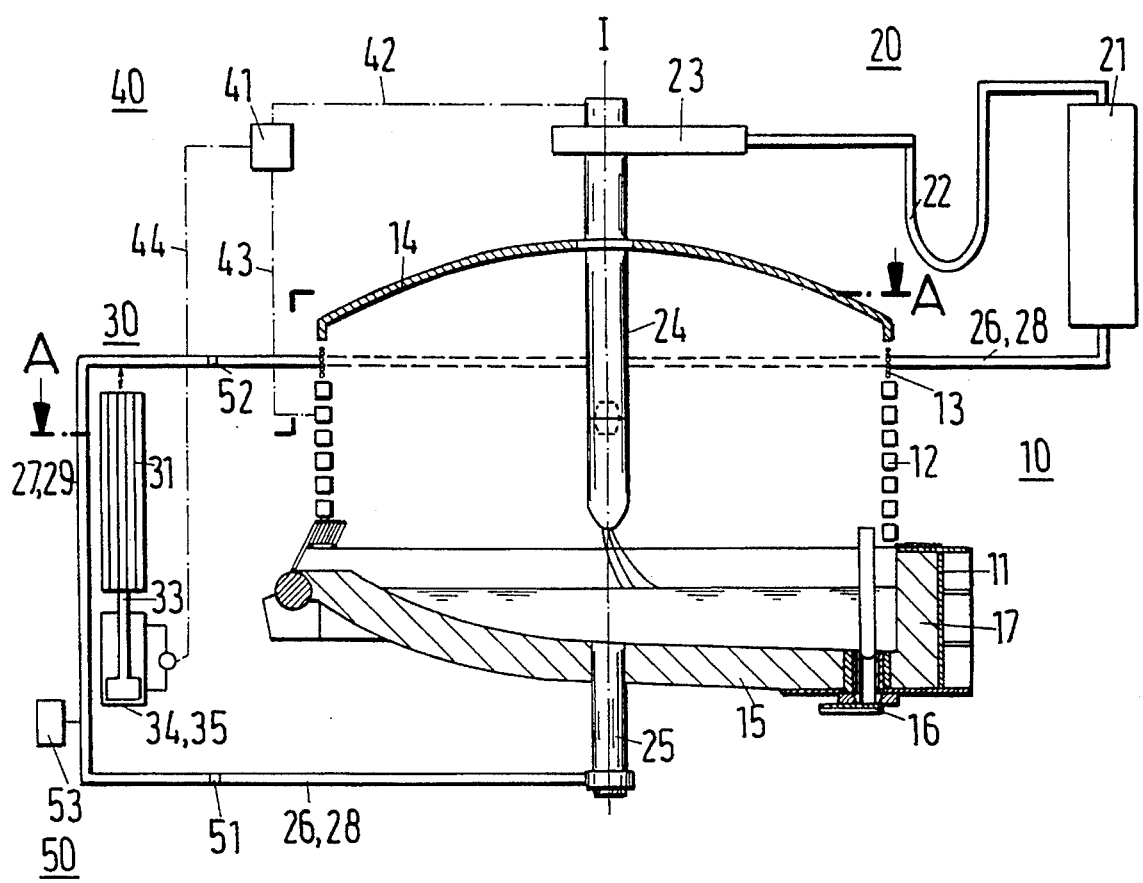
FIG. 1 is a side view of an electric arc furnace pursuant to the present invention.

FIG. 1 shows an electric arc furnace vessel 10 with a lower vessel part 11 and a first upper vessel part 12 made of copper and a second upper vessel part 13 made of steel. The vessel is closable by a cover 14. The lower vessel 11 has a bay 17 in which there is a tap hole 16. In the bottom 15 of the vessel 10 there is a bottom electrode 25, which is designed as an anode.

This bottom electrode 25 is connected to a direct current source 21 of the current supply device 20, first of all, via an essentially horizontal line 26, which has a line segment 27 parallel to the furnace main axis I, and secondly via a horizontal line segment 28, which has a line segment 29 parallel to the main axis I. The direct current source 21 is also connected via a feed 22 to an electrode 24 mounted on a carrying device 23.

Between the line segments 27 and 29, and the upper furnace vessel 12, 13, there is arranged a screening composed of a vertically movable shield 31 or a horizontally movable shield 32. The vertically movable shield 31 is connected via a guide rod 33 with moving means 34. In the example shown, the moving means is a piston cylinder unit 35. The horizontally movable shield 32 is movable on a horizontal track or guide rail 36 by a mechanical drive 37 which includes a motor M.

Furthermore, a measurement and control system 40 is provided, which has a measurement and control device 41 that is connected to measurement lines for the current 42, a measurement line for the temperature 43, and similar measurement elements. A control line 44 connects the control device 41 to the moving means 34.

Figure 2:
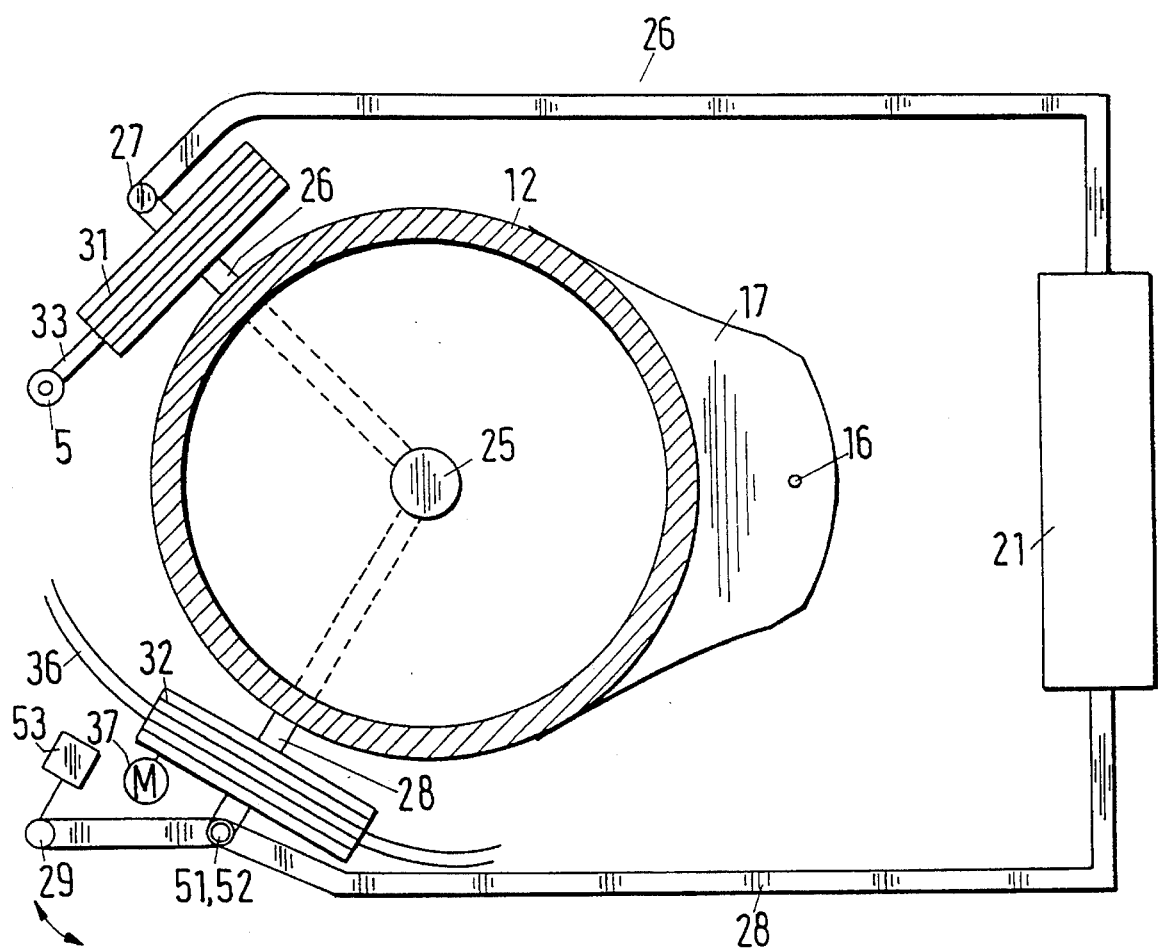
FIG. 2 is a top view of the electric arc furnace.

The same reference numerals are also used in the embodiment of FIG. 2. In the line segment 29 of this embodiment, a swinging device 50 is shown. This swinging device 50 has a drive 53, that is connected to the vertical line segment 29. Hinges 51, 52 are arranged in the feed-and-lead-off line 28 to permit swinging of the line segment 29. Hinges can also be provided in the line 26 to permit swinging of the line 27.

The invention is not limited by the embodiments described above which are presented as examples only but can be modified in various ways within the scope of protection defined by the appended patent claims.

What is claimed is:

1. A direct current electric arc furnace for melting metal, comprising: a furnace vessel having a lower vessel part lined with a refractory material and a metal upper vessel part through which a cooling agent flows; a cover adapted and arranged to close the furnace vessel; means for feeding electric current to the furnace, the feeding means including a main electrode extending into the furnace vessel through the cover, a bottom electrode located in a bottom of the lower vessel part, and feed lines that permit connection of the electrodes to a direct current source, the feed lines including at least two current feeds connected to the bottom electrode, each current feed having a line segment parallel to a main axis of the main electrode; and means for at least partially magnetically shielding the upper vessel in a region of an arc between the main electrode and the bottom electrode from magnetic fields generated by the line segments parallel to the main axis, the shielding means including a shield and drive means for moving the shield parallel to the upper vessel to block and weaken the magnetic field produced by the line segment current at the arc region.

2. A direct current electric arc furnace as defined in claim 1, wherein the drive means for moving the shield includes a piston cylinder unit.

3. A direct current electric arc furnace as defined in claim 2, and further comprising control means for controlling the piston-cylinder unit, a control line that connects the piston-cylinder unit to the control means, and at least one of electrode current measuring means and furnace temperature measuring means connected to the control means.

4. A direct current electric arc furnace as defined in claim 2, wherein the drive means includes guide rods which connect the shield with the piston-cylinder unit so that the shield is moved parallel to the axis to the electrode.

5. A direct current electric arc furnace as defined in claim 1, wherein the drive means includes horizontal guide rails and an electromechanical drive operatively connected to the shield so that the shield is horizontally moveable.

6. A direct current electric arc furnace as defined in claim 1, wherein the upper vessel has a mouth directed toward the lower vessel, the upper vessel being made of copper at the mouth.

7. A direct current electric arc furnace as defined in claim 1, and further comprising means for swinging at least one of the line segments to change a distance between the line segments.

8. A direct current electric arc furnace as defined in claim 7, wherein the swinging means includes hinges provided in at least one of the feeds to permit swinging of a corresponding line segment.

* * * * *